Dec. 2, 1941.  P. H. BRACE  2,265,025
ELECTROMAGNETIC INSPECTION SYSTEM
Filed Sept. 27, 1940
Fig. 1.
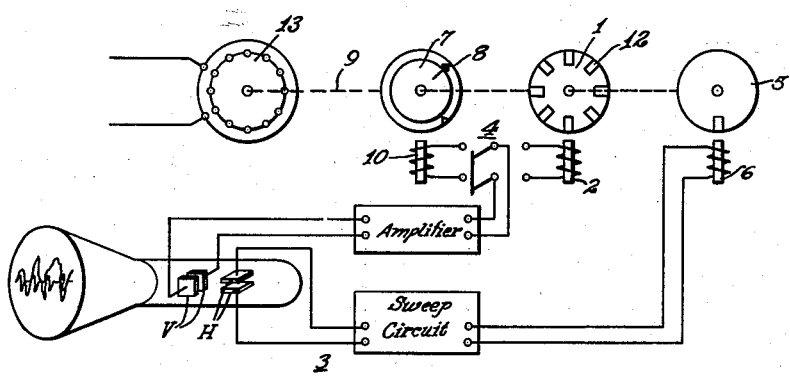
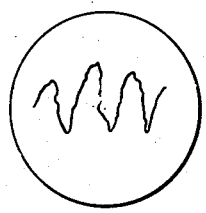
Fig. 2.
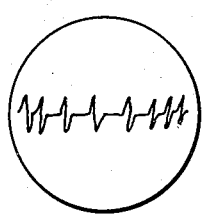
Fig. 3.
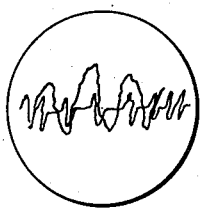
Fig. 4.
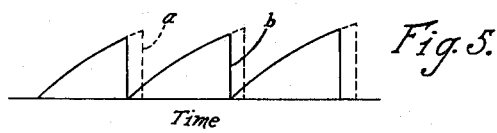
Fig. 5.
WITNESSES:
E. F. Oberheim
Wm. J. Ruano
INVENTOR
Porter H. Brace
BY
Paul E. Friedemann
ATTORNEY Patented Dec. 2, 1941

2,265,025

UNITED STATES PATENT OFFICE 2,265,025

ELECTROMAGNETIC INSPECTION SYSTEM

Porter H. Brace, Forest Hills, Pa., assignor to Westinghouse Electric & Manufacturing Company, East Pittsburgh, Pa., a corporation of Pennsylvania Application September 27, 1940, Serial No. 358,640

8 Claims. (Cl. 175—183)

My invention relates to a system for electromagnetic inspection which is particularly useful in the detection of flaws in a test piece such as a race of a ball bearing or roller bearing.

An object of my invention is to provide a system which will not only determine the relative magnitudes of intensity produced by flaws on a rotatable test piece but which will accurately determine the angular position of such flaws so that they may be definitely located.

Another object of my invention is to provide a cathode ray indicating device with means for determining with absolute precision the angular position of a recorded flaw as well as the intensity thereof. A cathode ray oscilloscope provides one practical means for accomplishing this by means of an extra horizontal index line having a plurality of small wave forms which are indicative of a definite angular location of any point on the magnetic intensity characteristic curve of a test piece, which curve is either superimposed or otherwise associated with the horizontal index line.

Other objects and advantages will become more apparent from a study of the following specification when considered in conjunction with the accompanying drawing, in which:

Figure 1 is a schematic showing of a control system embodying the principles of my invention;

Fig. 2 is a characteristic curve such as obtained on the cathode ray screen of the variations in magnetic intensity of magnetic flaws present along the periphery of a rotatable test piece 7;

Fig. 3 is a characteristic curve obtainable by a goniometer wheel 1;

Fig. 4 is characteristic curves obtained by superimposing the curve shown in Figs. 2 and 3; and Fig. 5 shows the characteristic curves of a condenser circuit in the sweep circuit of a cathode ray oscilloscope, or oscillograph, as modified by the elements 5 and 6.

In electromagnetic inspection devices it is desirable to have ready means for identifying the position on the piece being inspected of magnetic peculiarities, registered on the oscilloscope or equivalent indicating or recording element of the system.

My invention relates to a cathode ray indicating device, and particularly to one used for magnetic detection of flaws in a rotatable test piece. In the method of detecting defects in magnetizable objects as disclosed in an earlier filed patent application Serial No. 238,600 entitled "Electromagnetic testing systems," now Patent No. 2,221,570, issued November 12, 1940, in which Clifton S. Williams and I were co-inventors, it is often desirable to accurately locate the position of a defect on the piece being inspected. In the device disclosed in said earlier filed application, the cathode-ray oscilloscope acting as the detector of defects has incorporated within itself a so-called "linear sweep" circuit which provides a nominally linear time base which is applied to the oscilloscope deflection plates, thus providing horizontal displacement of the oscilloscope beam at the same time that the characteristics of the piece being inspected are applied to the vertical deflection plates, thus producing the trace characteristic of that piece inspected. In said earlier filed application, the horizontal sweep is correlated with the test piece as it rotates by an impulse taken from the rotating shaft once each revolution of the test piece. This impulse serves to initiate the sweep but has no further control until the revolution has been completed. This then means that the relationship between position (horizontal) on the trace and position on the piece being tested is definite at only one point, the relationship at all other points being dependent on the control setting, linearity, and stability of the sweep circuit.

Briefly stated, an object of my invention is to provide a method of continuously controlling the horizontal movement of the oscilloscope beam, thus removing the dependence upon the factors just mentioned with the attendant uncertainties.

This I propose to accomplish, briefly, by attaching to the member which carries the part being inspected a series of small magnets, these to be disposed in a known manner with respect to some chosen orientation of the test piece. Cooperating with these magnets I propose to use a detector element, for example, a small core of readily magnetizable material such as "Hipernik" disposed within a coil.

Referring more particularly to Fig. 1, a goniometer wheel 1 is provided with a plurality of evenly spaced magnets 12 along its periphery. Thus, as the test piece is rotated, the magnets on the "goniometer wheel" 1 move past the detector 2, called the "goniometer pick-up" and give rise to electrical pulsations which are transmitted to an indicating or recording device such as a cathode-ray oscilloscope or oscillograph 3, when the commutating switch 4 is thrown to the right hand position.

In addition to the foregoing elements there is a "synchronizing wheel" 5 and associated pickup coil 6, the latter being connected to the oscilloscope through external synchronizing terminals 11 to initiate the indicating or recording cycle when the system comprising test piece 7, goniometer wheel 1, and synchronizing wheel 4 are in definite positions with reference to their respective pick-up elements. Curve a in Fig. 5 illustrates the charging and discharging of a condenser (not shown) in the conventional sweep circuit of a cathode ray oscilloscope. The peaks of these curves, however, may vary in spacing due to errors in the system. However, by cutting short these curves (see curve b) by means of "pick-up" 6 a definite and equal spacing may be secured for all of the peaks of curve b and absolute synchronization with elements 5 and 1 may be secured in the sweep circuit.

Assuming that a cathode-ray oscilloscope is being used as an indicating or recording means, the operation of my system may be outlined as follows: The test piece 7 is provided with a fiducial mark 8, and is mounted on the shaft 9, together with the goniometer wheel 1, and the synchronizing wheel 5, all of which are driven by a driving motor 13. The mark on the specimen, one of the magnetic inserts in the goniometer wheel and the magnetic insert in the synchronizing wheel are brought into similar angular positions with reference to their respective pick-up elements. The commutating switch 4 is thrown to the left to connect the "vertical" deflection plates V of the cathode-ray oscilloscope to the test pick-up 10, and the synchronizing pick-up is connected to the horizontal plates H, that is, the sweep-control circuit of the oscilloscope.

When the shaft 9 is rotated, the trace on the oscilloscope screen assumes a form indicative of the variations of magnetization around the circumference of the test piece. This trace may be photographed or otherwise recorded as indicated in Fig. 2. Having done this, the commutating switch is thrown to the right to connect the goniometer pick-up 2 to the oscilloscope. The record of this from the goniometer wheel will in general consist of a horizontal line with vertical indentations corresponding to the passage of its magnets past the pick-up, as indicated in Fig. 3. It will be noted that while the magnets are equally spaced around goniometer wheel 1 the spacing of the vertical indentations in Fig. 3 may be unequal as illustrated, that is, further spaced in the middle of the tracing than at the ends, as is the ordinary case in practice.

Since the circumferential locations of the goniometer magnets is known with reference to the fiducial mark on the test piece, superposition of the two records of Figs. 2 and 3 forming the record shown in Fig. 4 makes it possible to determine what region on the test piece has given rise to any particular magnetization feature on the oscillographic record. A convenient way of obtaining the combined record is to photograph the two records on the same plate, holding this stationary meanwhile. "Persistent" oscilloscope screens may be used. Thus tracings or photographs may be made of the two records simultaneously.

Thus there is obtained a record which allows the position of magnetic peculiarities on the circumference of the test specimen to be accurately located at leisure, thereby greatly facilitating metallographic or other investigations as to the cause and cure of defects and irregularities.

Instead of using two pick-up coils, one for the specimen and the other for the goniometer wheel, the same coil may be used, moving it to cooperate first with the specimen and then with the goniometer wheel.

Alternatively the goniometer wheel may carry one magnet cooperating with a series of circumferentially disposed pick-up coils.

Again the magnet on the synchronizing wheel may be arranged to cooperate with a spaced series of goniometer pick-ups in addition to the synchronizing pick-up.

Instead of magnets and pick-up coils, electrostatic arrangements or actual momentary contacts may be used to provide the basic action covered by my invention, namely the creation of two or more successive records, one of the magnetic condition of the test specimen and the other of the location of predetermined reference points and the correlation of these records to enable accurate determination of the position on the specimen of peculiarities.

My invention has particular reference to the exploration of magnetizable test specimens. However, I also contemplate the application of this principle to the inspection of other materials, variance of whose properties may be translated into electrical impulses, for example, transparency of glass objects, dielectric properties of insulating materials, electrical resistivity of conductive bodies, dimensional variance of solid objects, etc. Photocells, capacitance variation, eddy-current phenomena or displacement of "feeler" elements may be applied in ways that will readily occur to those skilled in the art to the solution of the respective inspection problems mentioned above.

The foregoing examples are cited, not to limit but rather to illustrate the wide scope of the present invention.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. An inspection device for determining the occurrence and locations of irregularities on a body to be tested, comprising means movable relative to said body for creating electrical impulses corresponding with said irregularities, means including a plurality of magnetic elements having a fixed relationship with respect to inspected portions of said body to be tested, electric means for detecting said elements and for translating them into electrical impulses, means for recording or indicating, respectively, both of said series of impulses on a screen so that they may be compared for ascertainment of the exact localities of the irregularities on said body.

2. A device for detecting magnetic irregularities and their locations on a body to be tested, comprising magnetic pick-up means relative to said body for detecting said irregularities, a second body mechanically coupled to the body to be tested having a plurality of magnetic elements spaced thereon, magnetic pick-up means for detecting said magnetic elements, and means for translating and for recording or indicating, respectively, both the magnetic impulses created by the body to be tested and said second body whereby comparison of both of said magnetic impulses can be made for determining the exact location of the various magnetic irregularities on said body to be tested.

3. A device for detecting the presence of magnetic particles and their respective locations on the periphery of a rotatable body to be tested comprising a second rotatable body mechanically coupled to the body to be tested having a plurality of magnetic elements spaced along the periphery thereof, magnetic pick-up means movable relative to said body for selectively detecting said particles and said magnetic elements and translating their presence into electrical impulses, means including a cathode-ray oscillograph for recording and combining both said impulses created by said particles and those created by said magnets, thereby making it possible to ascertain the locations of the various magnetic particles along the periphery of the body to be tested.

4. A device for detecting the presence of magnetic particles and their respective locations on the periphery of a rotatable body to be tested comprising a second rotatable body mechanically coupled to the body to be tested having a plurality of magnetic elements spaced along the periphery thereof, magnetic pick-up means movable relative to said body for selectively detecting said particles and said magnetic elements and translating their presence into electrical impulses, means including a cathode-ray oscillograph for recording and combining both said impulses created by said particles and those created by said magnets, thereby making it possible to ascertain the locations of the various magnetic particles along the periphery of the body to be tested, a third rotatable body mechanically coupled to said second rotatable body and having a magnetic element on its periphery, a third pick-up means responsive to said last-mentioned magnetic device for detecting said last-mentioned magnetic body and creating electrical impulses, said cathode ray oscillograph having vertical plates in the cathode-ray tube which are connected to said first-mentioned selective magnetic pick-up means and having horizontal or sweep circuit plates which are connected to said third pick-up means.

5. A device for detecting the presence of magnetic particles and their respective locations on the periphery of a rotatable body to be tested comprising a second body shaped similarly and mechanically coupled to said first body and having a plurality of magnets supported on the periphery thereof, means for rotating said bodies, stationary magnetic pick-up coil means for selectively detecting the presence of said particles and of said magnets and for translating them, respectively, into electrical impulses, means including a cathode-ray oscillograph for recording and combining both said impulses created by said particles and those created by said magnets, thereby making it possible to ascertain the locations of the various magnetic particles along the periphery of the body to be tested.

6. A device for detecting the presence of magnetic particles and their respective locations on the periphery of a rotatable body to be tested comprising a second body shaped similarly and mechanically coupled to said first body and having a plurality of magnets supported on the periphery thereof, means for rotating said bodies, stationary magnetic pick-up coil means for selectively detecting the presence of said particles and of said magnets and for translating them, respectively, into electrical impulses, means including a cathode-ray oscillograph for recording and combining both said impulses created by said particles and those created by said magnets, thereby making it possible to ascertain the locations of the various magnetic particles along the periphery of the body to be tested, a third rotatable body mechanically coupled to said second rotatable body and having a magnetic element on its periphery, a third pick-up means for detecting said last-mentioned magnetic body and translating it into electrical impulses, said cathode ray oscillograph having vertical plates in the cathode ray tube which are connected to said first-mentioned selective magnetic pick-up means and having horizontal or sweep circuit plates which are connected to said third pick-up means.

7. A device for detecting the presence of magnetic particles and their respective locations on the periphery of a rotatable body to be tested comprising a second body shaped similarly and mechanically coupled to said first body and having a plurality of magnets supported on the periphery thereof, means for rotating said bodies, a pair of stationary magnetic pick-up coils, one associated with each body, a double-throw switch, a cathode ray oscillograph having a pair of vertical electrodes, circuit means including said double-throw switch for selectively connecting either of said pick-up coils to said vertical electrodes, and means for including said cathode ray oscillograph for recording and combining said impulses created by said particles and those created by said magnets, thereby making it possible to ascertain the location of the various magnetic particles along the periphery of the body to be tested.

8. A device for detecting the presence of magnetic particles and their respective locations on the periphery of a rotatable body to be tested comprising a second body shaped similarly and mechanically coupled to said first body and having a plurality of magnets supported on the periphery thereof, means for rotating said bodies, a pair of stationary magnetic pick-up coils, one associated with each body, a double-throw switch, a cathode ray oscillograph having a pair of vertical electrodes, circuit means including said double throw switch for selectively connecting either of said pickup coils to said vertical electrodes, and means for including said cathode ray oscillograph for recording and combining said impulses created by said particles and those created by said magnets, thereby making it possible to ascertain the location of the various magnetic particles along the periphery of the body to be tested, a third rotatable body mechanically coupled to said second rotatable body and having a magnetic element on its periphery, a third pick-up means for detecting said last-mentioned magnetic body and translating it into electrical impulses, said cathode ray oscillograph having vertical plates in the cathode ray tube which are connected to said first-mentioned selective magnetic pick-up means and having horizontal or sweep circuit plates which are connected to said third pick-up means.

PORTER H. BRACE.